June 23, 1970 JAMES E. WEBB 3,517,268

ADMINISTRATOR OF THE NATIONAL AERONAUTICS AND SPACE ADMINISTRATION

PHASE DEMODULATION SYSTEM WITH TWO PHASE LOCKED LOOPS

Filed Sept. 10, 1965 4 Sheets-Sheet 1

THOMAS HUDSPETH
INVENTOR.

BY [signature]
[signature]
ATTORNEYS

June 23, 1970 JAMES E. WEBB 3,517,268
ADMINISTRATOR OF THE NATIONAL AERONAUTICS AND SPACE ADMINISTRATION
PHASE DEMODULATION SYSTEM WITH TWO PHASE LOCKED LOOPS Filed Sept. 10, 1965 4 Sheets-Sheet 2

INVENTOR.
THOMAS HUDSPETH

BY

ATTORNEYS

INVENTOR.
THOMAS HUDSPETH
BY
[signature]
Howard B. Scheckman
ATTORNEYS

INVENTOR.
THOMAS HUDSPETH
BY
ATTORNEYS

United States Patent Office 3,517,268
Patented June 23, 1970

3,517,268

PHASE DEMODULATION SYSTEM WITH TWO PHASE LOCKED LOOPS

James E. Webb, Administrator of The National Aeronautics and Space Administration, with respect to an invention of Thomas Hudspeth, Malibu, Calif.

Filed Sept. 10, 1965, Ser. No. 486,573
Int. Cl. H03d *3/24;* H03f *3/06*
U.S. Cl. 329—122 5 Claims

ABSTRACT OF THE DISCLOSURE

The phase demodulation system is disclosed in which a phase modulated carrier frequency is operated upon to provide an output which represents the frequency modulation of the carrier signal. The system includes a first stage, which includes a phase locked loop to which the frequency modulated carrier frequency is supplied, designed to provide a first output which represents a frequency modulated intermediate frequency and a second output which consists of an unmodulated intermediate frequency, the intermediate frequencies of the two outputs having a constant phase relationship. The two outputs are supplied to a second stage, forming a phase locked loop to produce the desired system output.

This invention relates to phase demodulators and more particularly to a phase demodulation system capable of satisfactorily operating under poorer signal-to-noise conditions than conventional limiter-discriminator systems employed heretofore, and in which the carrier is reconstructed locally for use as a phase reference.

As is well-known to those versed in the art, phase-modulation techniques are frequently used in the telemetering of data via a radio link. The apparatus of the present invention is particularly applicable to the demodulation subsystems of such phase-modulated telemetering systems and especially to such systems employing a phase-lock loop. The present invention provides a phase-lock servo capable of maintaining a phase demodulator in its linear range, and also allows the input signal modulation to be as great as 1.5 radians thereby increasing the dynamic range and usability of the modulator.

In telemetry systems of the prior art, various demodulation schemes have been considered for use in those applications in which signal-to-noise ratio is an important limitation. Reconstruction of the signal carrier locally, to provide a reference signal for the phase detector in which the phase-modulated signal is to be demodulated, is an improvement, with regard to threshold, over an ordinary limiter-discriminator demodulator. In such a system the carrier is always present in the received signal, and is easily reconstructed locally because of the narrow bandwidth of the phase tracking loop. Random variations in the point at which a usable signal can be distinguished at the signal-to-noise ratio threshold of a limiter-discriminator system is avoided by memory of the carrier phase. There is a limitation, however, on the maximum deviation of the modulated signal since the phase detector becomes non-linear for phase deviations of more than about a radian peak. The technique employed in the present invention extends the limits of modulation beyond the above-described system.

A phase-lock servo includes a phase modulator and a phase detector. Typically, a modulated signal is fed to the phase detector and part of the output of the phase detector is fed to a phase modulator along with a reference signal from a local oscillator. The phase modulator modulates these two signals, which are then fed back to the phase detector to complete the loop. The phase modulator attempts to make the phase of the reference signal follow the phase of the modulated signal which is fed to the phase detector, in order to reduce the phase difference between them, thus enabling the detector to operate within its linear range.

The reduction in deterioration of the signal-to-noise ratio which occurs during demodulation makes the phase-sensitive servo-loop demodulator an attractive system. This basic advantage is particularly important in the modulating loop signals in the presence of noise and stems from the fact that the phase-sensitive servo loop performs only essentially linear operations on the signal and noise components whereas with other systems, depending upon non-linear circuit characteristics for their operation, some of the signal energy is converted into unusable sidebands and the signal-to-noise ratio is diminished. However, it has not been possible, or practical, in many instance heretofore to use the phase-sensitive servo-loop demodulator in its previously known form because of certain inherent instabilities caused by such factors as variable temperature, humidity, power supply voltage, etc. By the present invention there is provided novel means for reliably obtaining the aforementioned advantages without the disadvantages attributable to prior systems.

It is therefore an object of this invention to overcome the causes of instability of prior phase-lock loop demodulators and to provide long-term stability and freedom from drift.

A related object is to provide a novel and improved phase demodulation apparatus.

A more specific object is to provide a phase demodulation system employing a phase-lock servo capable of maintaining a phase demodulator in its linear range.

Other objects of the invention will in part be obvious and will in part appear hereinafter.

The invention will be understood more completely from the following detailed description, taken in conjunction with the drawings, in which.

Figures 1, 3:
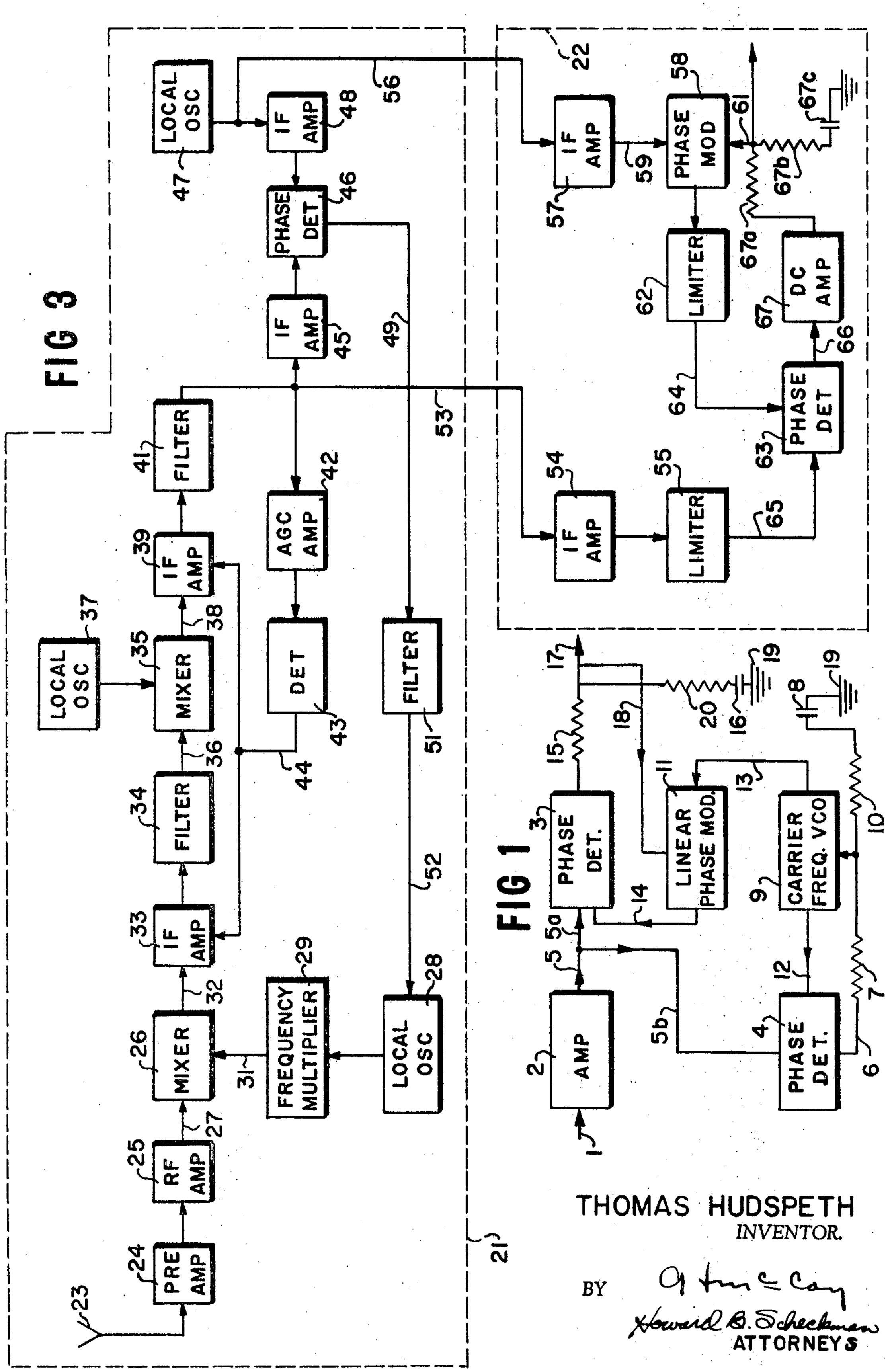
FIG. 1 is a simplified block diagram of a demodulator system according to the invention.
FIG. 3 is an expanded block diagram illustrating an overall demodulator system according to the invention.

Referring to FIG. 1 there is shown, in simplified form, a block diagram of a phase demodulation system, according to the invention, which extends the limits of modulation as compared with that permissible in prior phase-modulated telemetry systems. The incoming phase-modulated signal is supplied on line 1 to input amplifier 2. The output from amplifier 2 is supplied to two separate phase detectors, namely detector 3 and detector 4, via line 5. The output from detector 4 comprises a D-C error signal on line 6 which is supplied to the network comprising resistors 7 and 10, and capacitor 8. This network (7, 8, and 10) has a long time constant and the error signal appearing at the output of the network is applied as a control voltage to voltage-controlled oscillator 9. The locally generated carrier frequency is obtained from oscillator 9 and is supplied, as the reference carrier, to phase detector 4, and also to phase detector 3 via linear phase modulator 11. As can be seen, there are two control loops rather than one as in prior phase-lock loop demodulator systems. The carrier is supplied to phase detector 4 via line 12 and to phase modulator 11 via line 13. After having been suitably shifted in phase, in a manner to be described hereinafter, the carrier is applied to the reference frequency input of phase detector 3 via line 14.

The D-C output from phase detector 3 is supplied to the short time constant network comprising resistors 15 and 20, and capacitor 16. The output from the network (15, 16, and 20) appears at terminal 17 and comprises the demodulated telemetry signal; this output is also supplied via line 18 as a control signal to modulator 11. The output at terminal 17 would be supplied to the tone filters in the overall telemetry receiving system.

The networks comprising resistors 7, 10, 15 and 20, and capacitors 8 and 16, are referenced to ground 19.

The carrier frequency oscillator 9 is operated at only one phase with respect to the carrier such as +90°, but not −90°. This can be determined by use of a quadrature phase detector, which will have one polarity of output when the phase is correct, and the opposite polarity when the phase is incorrect. This is common practice in phase-lock loop systems as part of their lock-in circuitry.

The output of the carrier oscillator 9 is applied to phase detector 3 through linear phase modulator 11 which shifts the phase of the carrier as a linear function of the control voltage appearing on line 18. The linear range of phase modulator 11 is equal to, or greater than, the peak-to-peak phase deviation of the signal to be demodulated appearing in line 1. By means of feedback, the phase of the reference signal to phase detector 3 tracks, with a small error, the phase of the input signal to the phase detector, and the phase detector is always working within its linear range. The short time constant of the network comprising 15 and 16 passes all expected modulation frequencies, and functions to provide stability to the feedback loop.

Alternatively, the phase modulator 11 may be inserted in the branch 5*a* of line 5 leading to phase detector 3, rather than in the reference oscillator line 13–14, and the results will be equivalent.

It is also possible to place the phase modulator 11 in the portion of signal line 5 common to both phase detectors 3 and 4 thereby providing modulation compression of the input signals to both phase detectors 3 and 4. The effect in phase detector 3 is the same as previously described, but enhancement of the carrier supplied to phase detector 4 would result so that signals with single-tone modulation indices of greater than 2.4, where the carrier is nulled, could be demodulated satisfactorily.

By way of example, the linear phase modulator 11 may comprise an all-pass network containing voltage-variable capacitors such as varactors with suitable means for applying the modulation voltage. In a typical construction a peak-to-peak phase variation of greater than 360° can be achieved at 43 megacycles and with 5 megacycle modulation bandwidth, by means of such a phase modulator. Other suitable phase modulators will be known to those skilled in the art.

Figures 2, 4C:
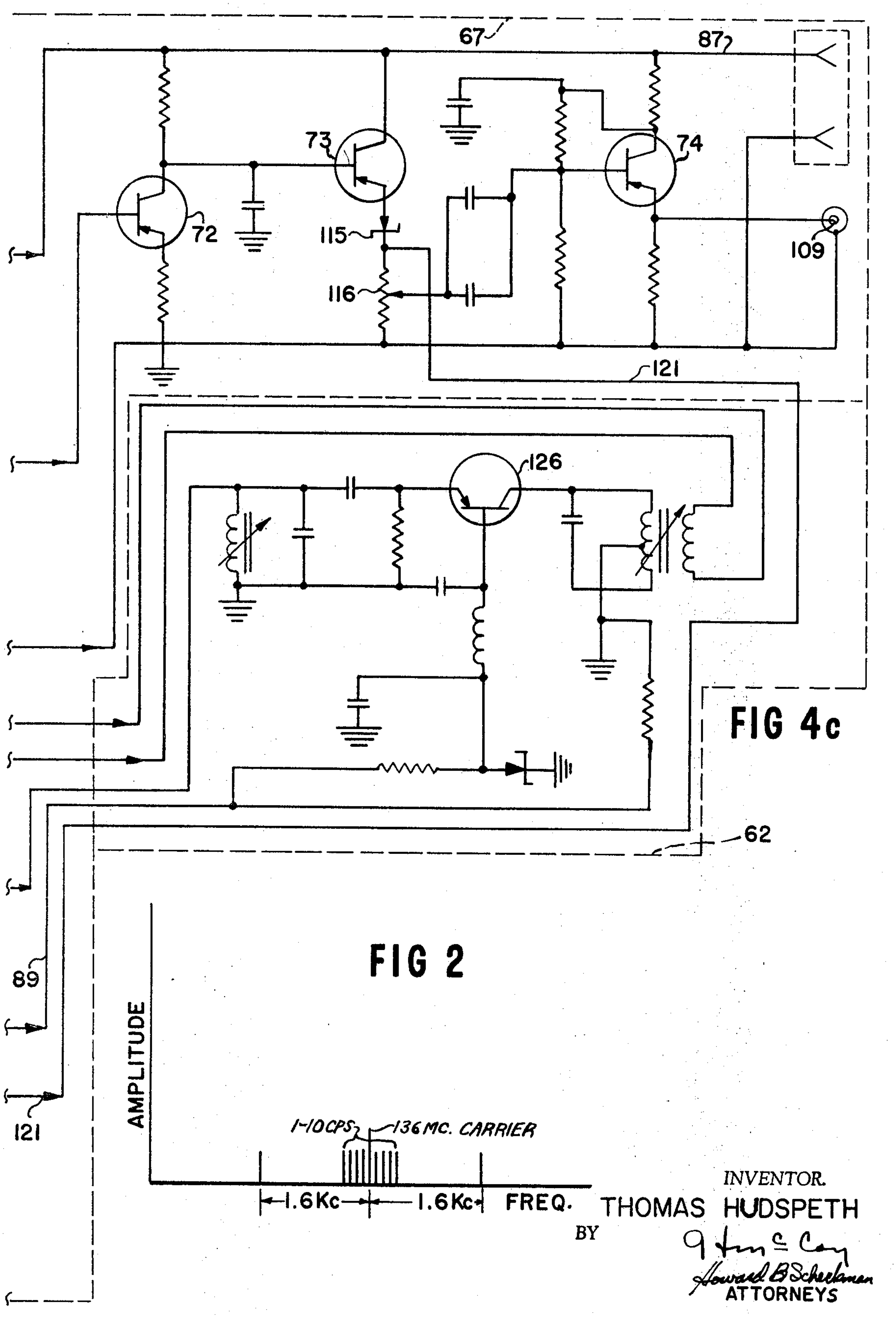
FIG. 2 is a frequency spectrum diagram illustrating frequency components of the input signal to be demodulated.
FIGS. 4A–4C are a schematic circuit diagram of the phase compression and detection system constructed according to the invention.

By making reference to FIG. 2 there is shown a frequency spectrum diagram and an indication of the frequency values at various points in the more complete block diagram of FIG. 3, which illustrates an overall demodulator system. In considering the system description which follows, it should be kept in mind that the advantage of the system of the present invention, as compared with conventional phase demodulators, is that by using a phase modulator to maintain the phase detector operating within its linear range, higher modulation indices may be employed at the signal transmitter, and linear demodulation may still be obtained in the receiver. Linear demodulation of pulses having a frequency of 1 to 10 c.p.s. would not be possible with conventional demodulators due to their high (1.5 radian) modulation index.

Referring now to FIG. 3, the components enclosed within dotted outline 21 constitute the principal circuit elements of a conventional phase-lock receiver, while the elements enclosed within the dotted outline 22 comprise the phase compression and detection portion of the system which are added to the conventional receiver circuit to comprise the novel apparatus of the present invention.

The input signal of the radio link which is to be demodulated is received by antenna 23. As is shown in FIG. 2, a typical input signal may comprise a 136 megacycle (mc.) carrier phase modulated by a 1.6 kilocycle (kc.) signal as well as by a spectrum of low-frequency pulses of the order of 1 to 10 cycles per second (c.p.s.). The low-frequency pulses may for example have a 1% duty cycle and a modulation index of 1.5 radians, while the 1.6 kilocycle signal modulation index may be about 1 radian.

After amplification via preamplifier 24 and radio frequency amplifier 25, the input signal is fed to mixer 26 via line 27. The mixer 26 combines the 136 mc. input signal on line 27 with a signal from line 31 at either 106 mc. or 166 mc., produced by a first crystal local oscillator 28 and frequency multiplier 29, which multiplies the local oscillator frequency by a factor of 12 to produce an intermediate frequency (IF) signal on line 32 at 30 mc. The 30 mc. IF signal on line 32 is amplified by an intermediate frequency amplifier 33 and fed through a filter 34 which removes noise and other extraneous signals outside of the filter band. A mixer 35 beats the filtered 30 mc. signal on line 36 with either a 36.6 or 23.4 mc. signal obtained from a second crystal local oscillator 37 to produce a second intermediate frequency signal on line 38 at 6.6 mc. The 6.6 mc. IF signal is amplified by 2nd intermediate frequency amplifier 39, after which it is passed through a 4 kc. bandwidth filter 41.

The 6.6 mc. output signal from the filter 41 is amplified by an automatic gain control (AGC) amplifier 42 and detected in an amplitude detector 43 to provide an automatic gain control voltage on line 44, the amplitude of which is a measure of the amplitude of the input signal voltage. The AGC voltage on line 44 is fed back to stabilize the signal gain through IF amplifiers 33 and 39.

The 6.6 mc. signal from the filter 41 is also applied, via an intermediate frequency amplifier 45 to a phase detector 46 which also receives a 6.6 mc. reference signal from a third crystal controlled local oscillator 47, the output of which is amplified by IF amplifier 48. The signal from the local oscillator 47 is 90° out of phase with respect to the carrier component of the signal from the filter 41. The phase detector 46 compares the instantaneous phase of the signal from filter 41 with the phase of the signal from local oscillator 47 and produces an output signal on line 49 which is proportional to the sine of the phase difference. By feeding back the output from phase detector 46, appearing on line 49, to the voltage controlled local oscillator 28 via low pass filter 51, a phase-lock loop is provided for the demodulator. Filter 51 comprises an RF network which passes signals up to 1 c.p.s. so that the phase-lock loop will respond to only small low frequency perturbations. The output of filter 51 is supplied to oscillator 28 on line 52.

The 6.6 mc. signal from the filter 41, appearing on line 53, is also applied via an intermediate frequency amplifier 54 to limiter 55 in the phase compression and detection system 22. The limiter 55 limits the maximum amplitude excursion of the phase demodulator signal to a predetermined constant value. The 6.6 mc. reference signal on line 56 from the local oscillator 47, after being amplified by IF amplifier 57, is applied to phase modulator 58 which phase modulates the reference signal on line 59 with the demodulated output signal from the system appearing on line 61. Amplitude excursions of the phase modulated signal from modulator 58 are limited by limiter 62, the output of which is applied to phase detector 63 via line 64. Phase detector 63 is similar in function to phase detector 46 and has as its alternate input the output signals from limiter 55 appearing on line 65.

Phase detector 63 furnishes an output signal on line 66 which is proportional to the sine of the difference in phase angle between the signals from limiters 55 and 62. The output signal on line 66 is passed through D-C amplifier 67 to produce the demodulated output signals from the system. These demodulated output signals appear on line 61.

As was mentioned previously, the output signals on line 61 are also fed back to phase modulator 58 to modulate the 6.6 megacycle carrier applied thereto via line 59. The purpose of phase modulator 58 is to cause the phase of the reference signal from local oscillator 47 to follow the phase of the modulated signal from filter 41 in order to reduce the phase difference between these two signals and to enable the phase detector 63 to operate within its linear range. It is pointed out, however, that either excessive noise or modulation which exceeds the dynamic tracking capability of the phase lock loop may cause the phase lock loop to assume an equilibrium condition other than at 90° phase difference between the signals on leads 64 and 65, thereby resulting in spurious step changes in the output signal. Therefore, during operation of the system care should be taken to ensure that the foregoing threshold conditions with respect to noise level and modulation will not be exceeded.

Figure 4A:
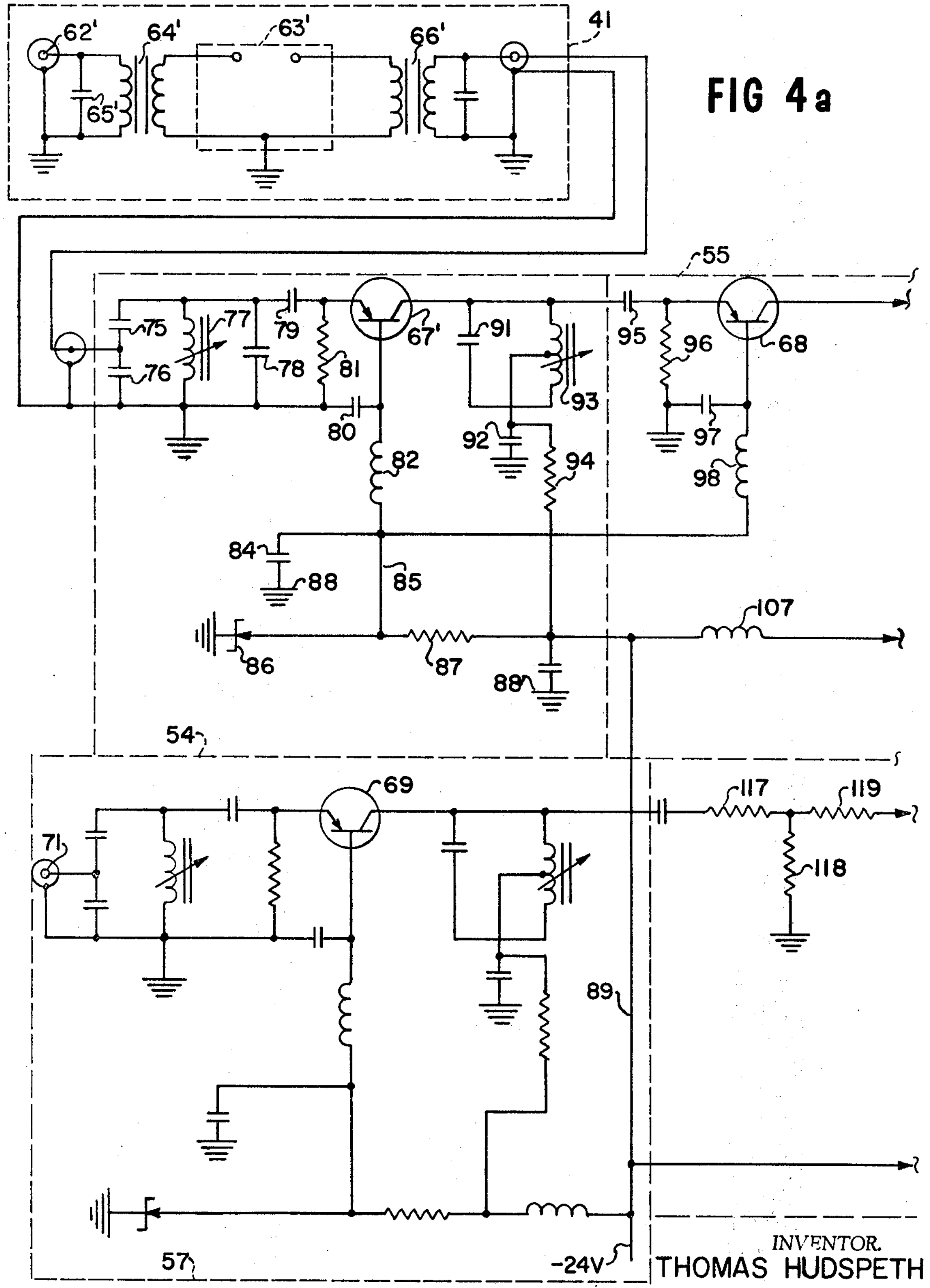
Figure 4B:
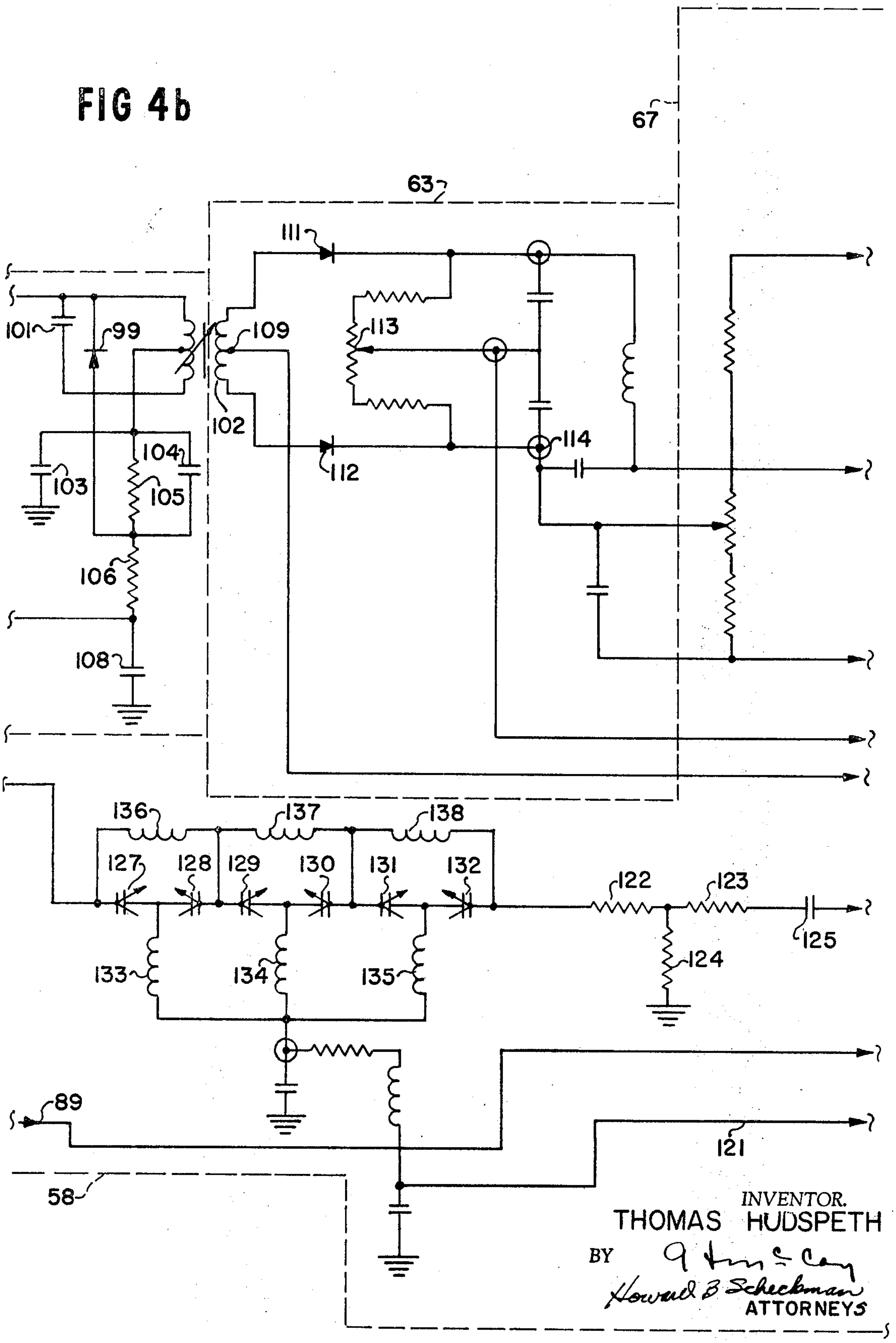

Looking now at FIGS. 4A, 4B, and 4C, there is shown a circuit diagram of the embodiment shown in block diagram form in FIG. 3. Those portions of the schematic circuit diagram which correspond to the various blocks of FIG. 3 are enclosed within dotted outlines and are identified with corresponding numbers. Many of the circuit details of FIGS. 4A–4C are not described hereinafter since their functioning will be obvious to those versed in the art.

Filter 41 receives a 6.6 megacycle input at terminal 62' (see FIG. 3). This signal is coupled to 4 kc. bandwidth (see FIG. 4*a*) which is supplied from IF amplifier 39 filter 63' of any suitable and well known construction by means of an impedance matching transformer 64' having its input shunted by capacitor 65'. Similarly, the output of the filter 63' is coupled by impedance matching transformer 66' to the input of IF amplifier 54 comprising transistor 67'. The output of transistor 67' is supplied to limiter 55 comprising transistor 68. The limiter output is supplied to one input of phase detector 63. The alternate input to phase detector 63 is obtained from limiter 62. The 6.6 megacycle reference input from local oscillator 47 (see FIG. 3) is supplied to IF amplifier 57, comprising transistor 69, via input terminal 71. The output of IF amplifier 57 is supplied as one input to phase modulator 58 and the alternate input to phase modulator 58 is obtained from amplifier 67 comprising transistors 72–74.

IF amplifier 54 comprises a tuned input stage consisting of capacitors 75 and 76 connected in shunt across tuned inductance 77 and the network comprising capacitors 78–80 and resistor 81. The base of transistor 67' is connected to a source of operating potential via radio frequency choke 82. Decoupling capacitor 84 is connected between ground 88 and supply lead 85, and the supply lead is clamped by means of Zener diode 86 at the −4 volt level. The supply lead 85 is connected to the −24 volt operating supply via series resistor 87. The −24 volt supply appears on line 89.

The IF amplifier 54 output circuit, which is connected between the collector of transistor 67' and ground 88, includes a capacitor 91 and an inductance 93 connected in parallel, with a tap on the inductance 93 being grounded through capacitor 92 and being connected to the −24 volt supply via resistor 94.

The output of the IF amplifier 54 is connected to the emitter of transistor 68 via coupling capacitor 95. The emitter is referenced to ground via resistor 96 and the base is bypassed to ground 88 via capacitor 97. Operating potential, in the form of −24 volts, appearing on line 85 is supplied to the base of transistor 68 via radio frequency choke 98. The output of transistor 68 obtained from the collector has its maximum amplitude excursion limited by diode 99 in the output circuit. The output circuit includes capacitor 101. The output is applied across the center-tapped primary of transformer 102 which drives the phase detector 63. The center tap of the primary of transformer 102 is coupled to the −24 volt supply via the network comprising capacitors 103–104, resistors 105–106, and radio frequency choke 107. The junction between choke 107 and resistor 106 is de-coupled by capacitor 108.

The secondary of transformer 102 is also center-tapped and drives diodes 111–112 of the phase detector 63. The reference input to the phase detector 63 from the limiter 62 and, more particularly, from the secondary of the transformer which is connected to the collector of transistor 126 of the limiter 62 (see FIG. 4*c*) is applied to the center tap 109 and to the arm of potentiometer 113 (see FIG. 4*b*). The D-C output signal corresponding to the detected phase difference of the inputs appears at point 114 and is supplied to the input of the D-C amplifier 67 comprising transistors 72–74. This amplifier is more or less conventional, except that the gain of its second stage (transistor 73) is clamped at a maximum level by means of the network comprising Zener diode 115 and potentiometer 116.

The demodulated signal output is obtained from the emitter of transistor 74 and appears at terminal 109.

IF amplifier 57 is substantially identical to IF amplifier 54 and its output is supplied through the attenuating network comprising resistors 117–119. This network has a 6 decibel insertion loss. The alternate input of the phase demodulator 58 is obtained from amplifier 67 via line 121. The output of the phase modulator 58 is supplied to the attenuating network comprising resistors 122–124. This network is identical to the network comprising resistors 117–119 and provides a 6 decibel attenuation.

Phase modulator 58 comprises a plurality of voltage-variable capacitors 127–132, which may be of the type known as Varicaps. These capacitors (127–132) vary in capacitance in proportion to the voltage impressed across them. Each capacitor comprises a part of an L-C network which includes inductances 133–138. Inasmuch as the capacitors 127–132 comprise a variable reactance element of the circuit the phase shift through the network may be varied as a function of a modulating voltage impressed upon these capacitors from amplifier 67. That is, the phase shift through the network depends upon the ratio of the reactance of capacitors 127–132 to the reactance of inductances 133–138. By cascading a number of network sections, as shown, the desired modulation index may be obtained. The attenuated output is supplied via coupling capacitor 125 to limiter 62.

Limiter 62 comprises transistor 126 and is constructed substantially the same as limiter 55 and has its output supplied to phase detector 63 as previously mentioned.

Summarizing, the phase-lock servo includes a phase modulator 58 and a phase detector 63. The modulated signal is fed to phase detector 63 and part of the output of the phase detector 63 is fed to phase modulator 58 along with a reference signal from local oscillator 47 via IF amplifier 57. The phase modulator 58 modulates these two signals and feeds its output back to the phase detector 63 to complete the loop. The phase modulator 58 attempts to make the phase of the reference signal follow the phase of the modulated signal fed to the phase detector 63 to reduce the phase difference between them and thereby enable phase detector 63 to operate within its linear range.

What is claimed is:

1. A system for demodulating a frequency modulated carrier of a first frequency, comprising:

a first stage including first means to which said modulated carrier is applied for providing a first output representing a frequency modulated signal of a second frequency which is lower than said first frequency, and a second output representing a signal of said second frequency which is not frequency modulated, said first and second outputs having a constant phase relationship; and a second stage including second means responsive to said first and second outputs of said first stage for providing an output which is indicative of the frequency modulation of said carrier.

2. The system as recited in claim 1 wherein said first means include at least one intermediate frequency means, including adjustable oscillatory means for providing a signal at a frequency related only to the frequency of the carrier, irrespective of the frequency modulation thereof.

3. A system for demodulating a frequency modulated carrier of a first frequency, comprising:

a first stage including first means to which said modulated carrier is applied for providing a first output representing a frequency modulated signal of a second frequency which is lower than said first frequency, and a second output representing a signal of said second frequency which is not frequency modulated, said first and second outputs having a constant phase relationship;

a second stage including second means responsive to said first and second outputs of said first stage for providing an output which is indicative of the frequency modulation of said carrier;

said first means include at least one intermediate frequency means, including adjustable oscillatory means for providing a signal at a frequency related only to the frequency of the carrier, irrespective of the frequency modulation thereof; and said second means including a phase detector responsive to said first output and to the output of a phase modulator in said second stage to which said second output is supplied, and means for feeding back to said phase modulator a signal related to the output of said phase detector.

4. The system as recited in claim 2 wherein said second means includes a phase detector responsive to said first output and to the output of a phase modulator in said second stage to which said second output is supplied, and means for feeding back to said phase modulator a signal related to the output of said phase detector.

5. The system as recited in claim 3 wherein said first means include a fixed oscillator for providing said second output, at least one intermediate frequency means including a variable frequency oscillator for providing an output, a mixer for mixing the input modulated carrier with the output of said variable frequency oscillator to provide said second output, phase detector means responsive to the output of said fixer oscillator and said first output, and filter means connected to said phase detector means and said variable frequency oscillator to control the latter to provide an output at a frequency which is a function of only the carrier frequency.

References Cited

UNITED STATES PATENTS

| | | | |
|---|---|---|---|
| 2,129,020 | 9/1938 | Murphy | 325—432 X |
| 3,119,067 | 1/1964 | Wohlenberg et al. | 325—434 X |
| 3,163,823 | 12/1964 | Kellis et al | 328—155 X |
| 3,199,037 | 8/1965 | Graves. | |
| 3,218,557 | 11/1965 | Sanders | 325—419 X |
| 3,308,387 | 3/1967 | Hackett | 328—155 |

ALFRED L. BRODY, Primary Examiner

U.S. Cl. X.R.

329—112; 325—419, 432; 331—25, 1